United States Patent [19]

Morita et al.

[11] 4,344,579
[45] Aug. 17, 1982

[54] APPARATUS FOR RECLAIMING AND RECYCLING THERMOSETTING SCRAP

[75] Inventors: Riyozo Morita; Yutaka Honjyo, both of Nagoya, Japan

[73] Assignee: Kabushiki Kaisha Meiki Seisakusho, Aichi, Japan

[21] Appl. No.: 830,893

[22] Filed: Sep. 6, 1977

[30] Foreign Application Priority Data

Sep. 3, 1976 [JP] Japan .................................. 51/106057

[51] Int. Cl.³ .......................................... B02C 13/286
[52] U.S. Cl. ....................................... 241/34; 241/36; 241/101 B; 241/101 D; 241/101.6; 241/154
[58] Field of Search .................. 241/101 D, 101.6, 77, 241/78, 79.1, 80, 34, 36, 101 B, 154

[56] References Cited

U.S. PATENT DOCUMENTS 3,200,867  8/1965  Stephan .......................... 241/101.6
3,995,819  12/1976  Kunogi et al. ..................... 241/58

Primary Examiner—Mark Rosenbaum
Attorney, Agent, or Firm—Browdy and Neimark

[57] ABSTRACT

Scrap of thermosetting plastics is reclaimed and recycled by an integrally combined apparatus which includes a device for pulverizing and atomizing the scrap, and a device for blending fine powder of the scrap with virgin material of thermosetting plastic. The device for blending includes a feed screw of constant revolution speed for conveying the fine powder of scrap and a variable speed feed screw for conveying virgin material in order to obtain high blending performance.

6 Claims, 3 Drawing Figures

APPARATUS FOR RECLAIMING AND RECYCLING THERMOSETTING SCRAP

FIELD OF INVENTION

The present invention relates to reclaiming and recycling thermosetting scrap, such as sprue, runner, and other discards, and more particularly, to an improved apparatus, comprising an integrated grinding-blending machine.

BACKGROUND OF THE INVENTION

It has been well-known to those skilled in the art that injection mold scrap of thermoplastic material can be reclaimed and recycled and that apparatus consisting of an integrally combined grinding device and a blending device has been developed, because thermoplastic material can easily be remelted and remolded.

Thermosetting material, however, can neither be remelted nor remolded; therefore, thermosetting scrap has been ground and used at best as a filler for virgin material, or as adding material to reduce the resin content of the compound, and has not been positively reused. On the other hand, recent research has proved that pulverized and atomized thermosetting scrap can be effectively used by blending with virgin material. An apparatus shown in U.S. Pat. No. 3,995,819 blends atomized thermosetting scrap with virgin material.

This invention relates to an improvement of said U.S. Pat. No. 3,995,819.

SUMMARY OF THE INVENTION

It is an object of the present invention to provide an improved apparatus integrally comprising a pulverizer, an atomizer, a mixing device, and a purifying means for noxious gases.

It is another object of the present invention to improve the combination of the pulverizer and the atomizer.

It is further object of the present invention to improve the mixing effect of the mixing device.

Other objects and the intended advantages of the present invention will become apparent from the detailed description to follow together with the accompanying drawings.

DETAILED DESCRIPTION OF THE INVENTION

Figure 1:
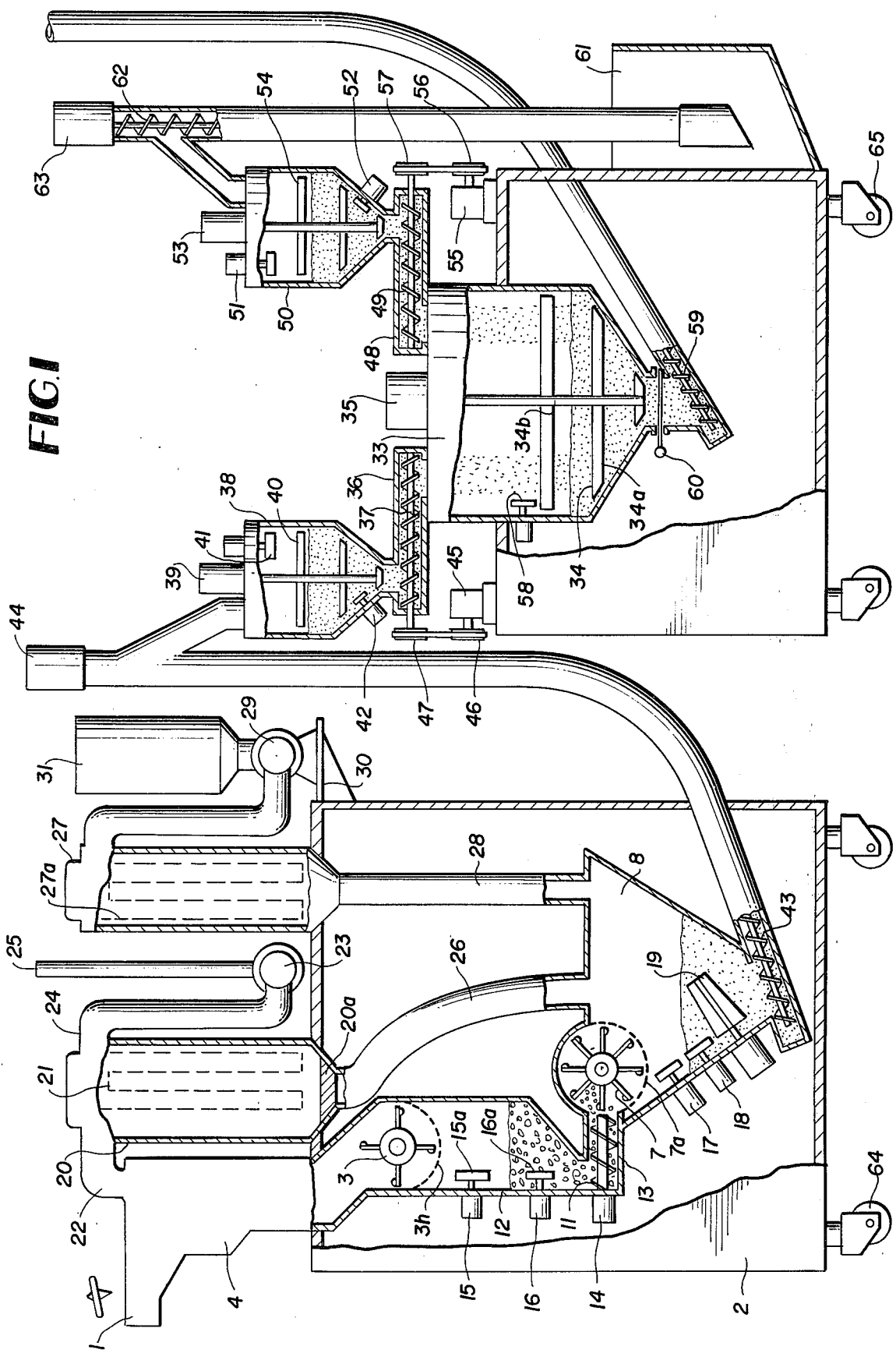
FIG. 1 is a elevational view, partly in section, of an embodiment of the present invention.

Now, a preferred embodiment of the present invention will be described hereunder in conjunction with the drawing.

Figure 2:
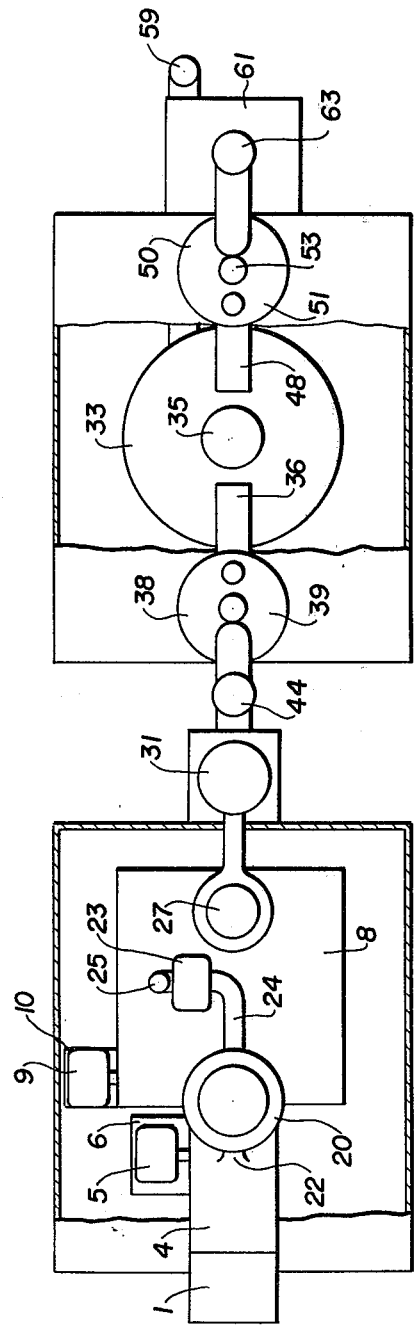
FIG. 2 is a plan view, partly in section of FIG. 1.
Figure 3:
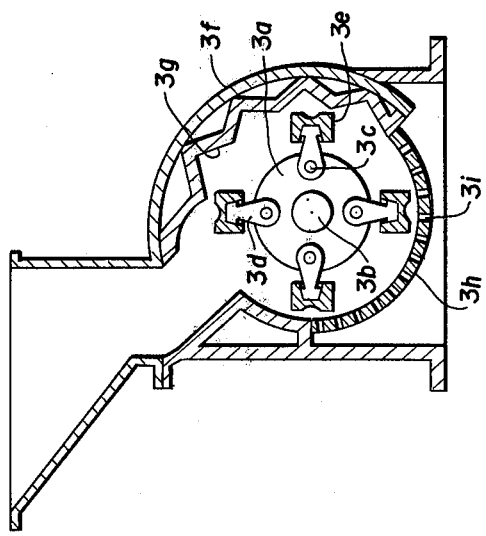
FIG. 3 is a elevational view in section of a pulverizer in accordance with the present invention.

Referring to FIGS. 1–3, a scrap inlet 1 is fixed on a frame construction 2. A pulverizer 3 is fixed in a throat 4. A screen 3h which is provided with the pulverizer 3 has a plurality of perforations 3i. Pulverized grain size is decided by the diameter of the perforations 3i. A motor 5 of the pulverizer 3 is supported on a platform 6. An atomizer 7 is fixed upon a hopper 8 for storing atomized powder. A motor 9 of the atomizer 7 is supported on a platform 10. A screen 7a for the atomizer 7 has a plurality of perforations as the screen 3h has.

A feed screw 11 is inserted rotatably in a feed cylinder 13 and the feed cylinder 13 is fixed in the bottom portion of the hopper 12 for the pulverized powder. The feed screw 11 is driven by a motor 14.

The hopper 12 is provided with a pair of fans 15a and 16a. These fans are respectively controlled by level limit switches 15 and 16. Thus the fan 15a continues to rotate so long as pulverized powder in the hopper 12 does not reach the level switch 15, and similarly fan 16a continues to rotate so long as pulverized powder does not reach the level switch 16. The pulverizer 3 commences operation according to a signal of the stoppage of fan 15a.

Also there are provided a level switch 17 for the upper limit and a level switch 18 for the lower limit in the hopper 8.

An agitator 19 is provided in the hopper 8.

A dust collecting device 20 is fixed on the frame construction 2. A bag filter 21 is provided within the dust collecting device. A pipe 22 is fixedly connected between the throat 4 and the dust collecting device 20. An exhauster 23 with an exhaust pipe 25 is mounted on the platform 2. A pipe 24 is fixedly connected between the dust collecting device 20 and the exhauster 23. Much floating fine powder is generated during pulverizing and atomizing the scrap in the air of the throat 4. When the air which contains the fine powder is exhausted by the exhauster 23, the fine powder is collected in the dust collecting device 20 by the bag filter 21. When the fine powder is stored to a predetermined amount in the dust collecting device 20, a shutter 20a is opened and the fine powder falls into the hopper 8 through a pipe 26 connected between the dust collecting device 20 and the hopper 8. A second dust collecting device 27 on the frame construction 2 has a bag filter 27a therein up stream of a gas purifier 31. There is fixedly connected a pipe 28 between the dust collecting device 27 and the hopper 8.

A bracket 30 is mounted on the side wall of the frame construction 2. An exhauster 29 is mounted on the bracket 30. The gas purifier 31 is mounted on the exhauster 29 and purifies noxious gas, that is formalin and ammonia gas which generate during pulverizing and atomizing. A hopper 33 for storing mixed scrap material and virgin powder is mounted in a frame construction of a mixing apparatus.

An agitator 34 for mixing atomized scrap and virgin material is provided within the hopper 33. A plurality of blades 34a is fixed on a center shaft 34b driven by a motor 35. A feed cylinder 36 for scrap powder, in which a feeding screw 37 is rotatably inserted, is mounted on the hopper 33. The feed screw 37 is rotated by a motor 45 through pulleys 46 and 47.

A hopper 38 is mounted on the feed cylinder 36. An agitator 40 is driven by a motor 39. There are a level switch 41 for detecting the upper limit and a level switch 42 for detecting the lower limit in the hopper 38.

A screw conveyer 43 is fixedly connected between the hopper 8 and the hopper 38.

A feeding cylinder 48 for virgin powder, in which a feed screw 49 is rotatably inserted; is mounted on the hopper 33. A hopper 50 is mounted on the feed cylinder 48. There are a level switch 51 for detecting upper limit and a level switch 52 for detecting lower limit in the hopper 50. An agitator 54 driven by a motor 53 is provided in the hopper 50. The feed screw 40 is rotated by a motor 55 through pulleys 56 and 57.

A level switch 58 for detecting the upper limit is provided within the hopper 33.

A screw conveyer 59 conveys mixed material to the required place.

A shutter 60 is fixedly connected in the bottom of the hopper 33. A hopper 61 for storing virgin material is provided on the side of the frame construction 33.

A screw conveyer 62 conveys virgin material in the hopper 61 to the hopper 50.

A motor 63 which drives the screw conveyer 62 is fixedly connected to an upper end of the screw conveyer 62. A plurality of wheels 64 are provided on the frame construction 2 and a plurality of wheels 65 is provided on the frame construction 32.

Referring to FIG. 3, shows the internal construction of the pulverizer 3.

A plurality of discs 3a are fixedly connected on a shaft 3b supported by a pair of bearings (not shown). A plurality of hammer rods 3d are pivotably connected respectively by pin 3c which is attached to the respective disc 3a. A hammer hed 3e is fixed respectively on the tip of each hammer rod 3d (high Mn or Ni-Cr steel). A corrugated liner 3g is fixedly attached to the inside of a case 3f. A screen 3h having a plurality of perforations 3a—perforation diameter in the embodiment is 8 mm—is fixed on the underside the case 3f. The perforation diameter of the atomizer screen is 2 mm.

Operation of the apparatus will be described hereinafter.

The motor 5 drives the pulverizer 3 and the scrap is subjected to smashing impact of the rotating hammer beads 3e and to collision with the corrugated liner 3g so as to be broken into rough pieces. The scrap that is ground into a fraction of its size, less than the size of the screen perforation 3i falls into the hopper 12. The roughly ground scrap is fed to the atomizer 7 by the feed screw 11. Atomized material less than the perforation size of the screen 7a falls into the hopper 8. In the case where the perforation diameter of the screen 7a is 2 mm, particle size from 20 to 200 mesh is produced. When roughly ground material reaches the level switch 15 in the hopper 12, the motor 5 of the pulverizer 3 is stopped by the signal given by the level switch 15. Also when atomized powder reaches the level switch 17 for the upper limit, the rotation of the feed screw 11 is stoppped by the signal of the level switch 17.

The motor 9 driving the atomizer 7 continues to drive for a moment after the rotation of the feed screw 11 has stopped, because further driving of the atomizer 7 can be done with ease.

The agitator 19 is provided for the prevention of powder bridging in the hopper 8.

The atomized powder stored in the hopper 8 is conveyed to the hopper 38 by the screw conveyer 43. The motor 44 of the screw conveyer 43 is stopped by the signal of the level switch 41 and again commences to drive according to the signal of the level switch 42.

The virgin material stored in the hopper 61 is conveyed by the screw conveyer 62.

The motor 63 driving the screw conveyer 62 is stopped by the signal of the level switch 51 and again commences to drive according to the signal of the level switch 52.

The mixing ratio of the material in the hopper 33 is determined by the difference of the amount which the feed screws 37 and 49 feed.

As diameter, pitch and channel depth of the feed screw 37 and 49 are dimensionally the same, the ratio of the speeds of the screws determines the mixing ratio of the material. In this invention, the revolution speed of the feed screw 37 is constant and that of the feed screw 49 is variable. The amount of the atomized powder which the feed screw 37 feeds into the hopper 38 per unit time, is restricted by the atomizing efficiency of the atomizer 7, but as sufficient amount of virgin material is supplied to the feed screw 49, constant revolution of the screw 37 is of advantage to making a larger mixing ratio than the constant revolution of the screw 49.

Material which falls into the hopper 33 is mixed by the agitator 34 and mixed material is supplied to the hopper of a thermosetting injection machine (not shown).

Noxious gas which generates during pulverizing and atomizing is purified by the gas purifier 31. As described above, the present invention permits positive reclaiming and recycling of the thermosetting scrap which has been considered in the prior art as difficult to recycle, and provides an apparatus which mixes atomized scrap powder with virgin material at a controllable ratio and furthermore purifies noxious gas generated during the grinding process.

It will be obvious to those skilled in the art that various changes may be made without departing from the scope of the invention and the invention is not to be considered limited to what is shown in the drawings and described in the specification.

What is claimed is:

1. An improved apparatus for reclaiming and recycling thermosetting plastic scrap which comprises:
   a pulverizer for grinding said scrap to provide pulverized scrap material,
   an atomizer for grinding said pulverized scrap material to provide atomized material,
   a feeding means to supply said pulverized material to said atomizer,
   a dust collecting device which collects the dust generated in the air during the grinding process in said pulverizer,
   a purifying means for noxious gases generated,
   a conveying means for conveying said atomized material to a first hopper,
   a first feed cylinder beneath said first hopper containing a feed screw and means to run said feed screw at a constant speed,
   a second hopper for virgin material,
   a second feed cylinder beneath said second hopper containing a variable speed feed screw,
   a third hopper for receiving a mixture of said atomized material from said first feed cylinder and said virgin material from said second feed cylinder, and
   means to control the ratio of atomized material and virgin material discharged into said third hopper by controlling the speed of said variable speed feed screw;
   further comprising means to hold material which has passed through said pulverizer and before being fed to said atomizer; retaining means for material which has passed through said atomizer located upstream of said conveying means for conveying atomized material to said first hopper.

2. An apparatus according to claim 1 wherein said atomizer grinds said scrap material to 20-200 mesh powder.

3. An apparatus according to claim 1 further comprising means for conveying the collected dust back into the system.

4. An apparatus according to claim 1 further comprising a second dust collecting device upstream from said purifying means for noxious gases generated.

5. An apparatus in accordance with claim 1 wherein said holding means comprises a pair of level limit switches for controlling the operation of said pulverizer.

6. An apparatus according to claim 1 wherein said first and second hoppers are each respectively provided with level limit switches to control, respectively, said conveying means for conveying said atomized material to said first hopper and the feed of virgin material to said second hopper.

* * * * *